United States Patent [19]

Kebo

[11] Patent Number: 5,144,476

[45] Date of Patent: * Sep. 1, 1992

[54] ALL-REFLECTIVE ZOOM OPTICAL SYSTEM

[76] Inventor: Reynold S. Kebo, 520 Beloit Ave., Los Angeles, Calif. 90049

[ * ] Notice: The portion of the term of this patent subsequent to Feb. 19, 2008 has been disclaimed.

[21] Appl. No.: 348,618

[22] Filed: Apr. 24, 1989

[51] Int. Cl.⁵ .............. G02B 17/06; G02B 23/06
[52] U.S. Cl. .................. 359/366; 359/422; 359/859
[58] Field of Search .............. 350/102–104, 350/537–538, 519, 571, 559–560, 617–621, 503–506, 442–444, 600–607; 359/364–366, 850, 854–866

[56] References Cited

U.S. PATENT DOCUMENTS

| | | | |
|---|---|---|---|
| 3,674,334 | 7/1972 | Abe | 350/620 |
| 4,205,902 | 6/1980 | Shafer | 350/620 |
| 4,226,501 | 10/1980 | Shafer | 350/619 |
| 4,265,510 | 5/1981 | Cook | 350/620 |
| 4,407,567 | 10/1983 | Michelet et al. | 350/607 |
| 4,659,171 | 4/1987 | Neil | 350/560 |
| 4,693,569 | 9/1987 | Offner | 350/505 |
| 4,804,258 | 2/1989 | Kebo | 350/505 |
| 4,812,030 | 3/1989 | Pinson | 350/505 |
| 4,906,078 | 3/1990 | Inabata et al. | 350/560 |
| 4,964,706 | 10/1990 | Cook | 350/505 |
| 4,993,818 | 2/1991 | Cook | 350/505 |

Primary Examiner—Bruce Y. Arnold
Assistant Examiner—Thone Nguyen

[57] ABSTRACT

The present optical system provides an all-reflective zoom optical system (10, 12, 14, 16 and 60, 62, 64). An imaging mechanism including one or more movable mirrors (12, 14, 16 and 60, 62) is utilized to effect the change in the magnification, field of view or both of the system.

20 Claims, 3 Drawing Sheets 3.6x POSITION 2.5x POSITION 1.7x POSITION

.5x POSITION

.25x POSITION

.167x POSITION

.125x POSITION

ALL-REFLECTIVE ZOOM OPTICAL SYSTEM

BACKGROUND

1. Technical Field

This invention relates to reflective telescope systems and, more particularly, to an all-reflective zoom optical system.

2. Discussion

The performance of conventional high quality telescopes when used on the earth for celestial viewing is principally limited to the earth's atmosphere rather than by the construction of the telescopes. Atmospheric effects not only limit the resolution of a telescope, but also absorb large portions of the electromagnetic spectral range. While in the past, little could be done about this limitation, today, with the help of earth satellites and other space vehicles, it is possible to place a telescope above the atmosphere and perform extraterrestrial observations without interference from it. As a result, there has arisen a need for a telescope which can more fully take advantage of this new environment. Also, it should be understood that the present invention may be utilized for other airborne or ground based applications that require viewing distant objects. This invention may also be used to transmit radiation.

The advantages of zoom optical systems are well known to those skilled in the art. However, virtually all of the known zoom optical systems utilize refractive optical elements in whole or in part. Refractive optical elements generally have one or more of the following disadvantages. Refractive systems generally have spectral limitations and chromatic aberrations. Refractive systems have size limitations, lens material limitations and a lack of radiation hardness. Refractive systems prohibit simultaneous multi-spectral operations in widely separated portions of the electromagnetic spectral range. Further, the refractive systems are sensitive to thermal changes and are exceptionally heavy when used in large aperture designs.

SUMMARY OF THE INVENTION

According to the teachings of the present invention, a system is provided which retains the versatility and benefits of zoom optics while eliminating the disadvantages of refractive optical systems. The present invention provides a fixed mirror and an all-reflective zoom system comprised of one or more movable mirrors which effect a change in magnification, field of view, or both. The lower magnification, coarser resolution, wider field of view extreme of the zoom range enables search and acquisition functions during operation of the system. The higher magnification, finer resolution and smaller field of view enables tracking and detailed imaging during operation of the system.

The present invention provides the art with an all-reflective afocal telescope which exhibits substantially unobscured capabilities. The present invention provides multi-spectral operation to enable simultaneous viewing of visual, television, laser and infrared spectra. The present invention enables beam splitting of collimated light among the various spectral bands at a viewing exit pupil. Imaging optics are generally placed behind the exit pupil to provide a final image plane.

In the preferred embodiment, the reflective zoom optical system is comprised of the following. A mirror is fixably positioned about a central axis. Also, the system includes a mechanism for reflecting an image of the object being viewed through an exit pupil for viewing. The reflecting mechanism is positioned to receive or reflect the light from the fixed stationary mirror and is movable through a plurality of positions to effect magnification, field of view, or both of the system.

BRIEF DESCRIPTION OF THE DRAWINGS

The various advantages of the present invention will become apparent to those skilled in the art after a study of the following specification and by reference to the drawings in which.

DESCRIPTION OF THE PREFERRED EMBODIMENT

Figure 1:
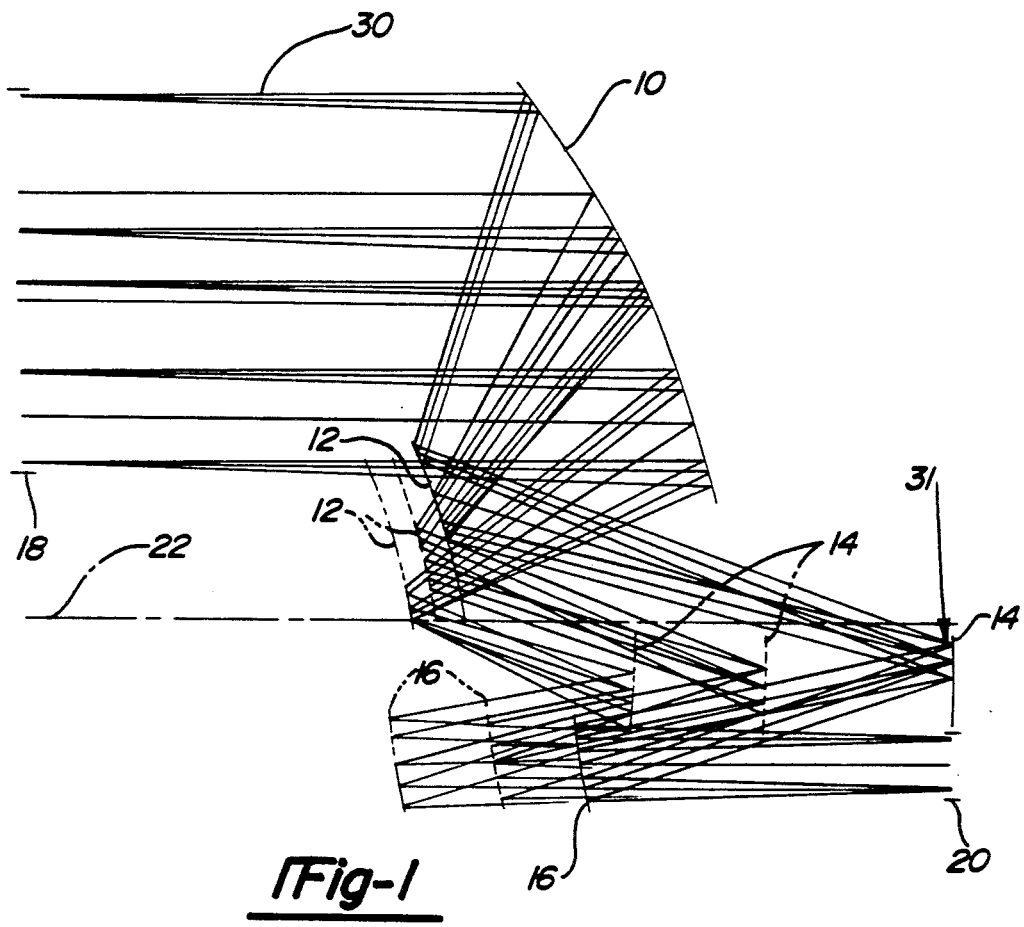
FIG. 1 is a schematic diagram of an along-scan view of an apparatus in accordance with the teaching of the present invention.

Referring to FIGS. 1 and 2a–2c, an afocal optical system is shown including primary 10, secondary 12, tertiary 14 and quaternary 16 mirrors. The system also includes a decentered entrance pupil 18 and a decentered exit pupil 20.

The primary mirror 10 includes a central axis 22 defining the system optical axis. The primary mirror 10 is fixably or stationarily positioned with respect to the optical axis. The primary mirror 10 is a positive power mirror and may be a paraboloid conic or higher order aspheric mirror.

The secondary mirror 12 is a negative power mirror and is movably positioned such that it is in a cassegrain configuration with the primary mirror 10. The vertex of the secondary mirror 12 would be positioned along the optical axis of the system. The secondary mirror 12 may be a hyperboloid conic or higher order aspheric mirror.

The tertiary mirror 14 is a positive power mirror. The tertiary mirror 14 is movably positioned such that its vertex would be positioned along the optical axis of the system. The tertiary mirror 14 may be of spherical shape, conic or higher order aspheric mirror.

The quaternary mirror 16 is a positive power mirror. The quaternary mirror 16 is movably positioned such that its vertex would be along the optical axis of the system. The quaternary mirror 16 may be of spherical shape, conic or higher order aspheric mirror.

The combination of movement of the secondary 12, tertiary 14 and quaternary 16 mirrors preserves the line of sight, focus collimation and exit pupil position during the zoom operation. All mirrors are rotationally symmetric and centered along a common optical axis and the movable mirror's movement is along the optical axis. The aperture entrance pupil is decentered with respect to the optical axis. The field of view is centered on the optical axis. Also, the size of the field of view in the object space varies at different magnifications. The exit pupil's 20 position is fixed during the zoom operation.

In operation, an object to be viewed is reflected by the primary mirror 10. The light beams 30 from the object being viewed are received and reflected from the primary mirror 10 to the secondary mirror 12. The light beams 30 are received by and reflected from the secondary mirror 12 to the tertiary mirror 14. The beams 30 form an intermediate image of the object being viewed between the secondary 12 and tertiary 14 mirrors at 31. The intermediate image, formed by beams 30, is reflected from the tertiary mirror 14 to the quaternary mirror 16 and through the remainder of the system and is ultimately reimaged at infinity after passing through the exit pupil 20.

Figure 2A:
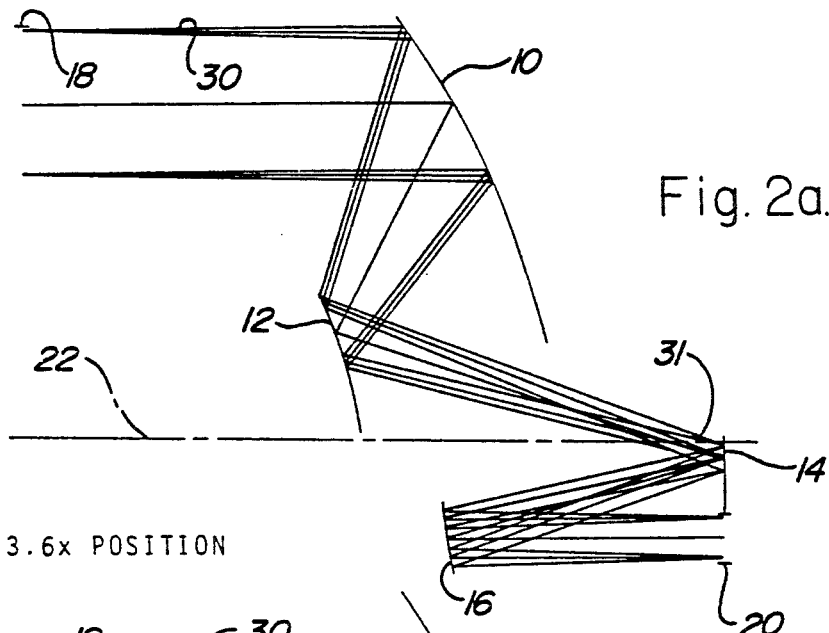
FIGS. 2a–2c are schematic diagrams of three zoom positions of the along-scan view of FIG. 1.
Figure 2B:
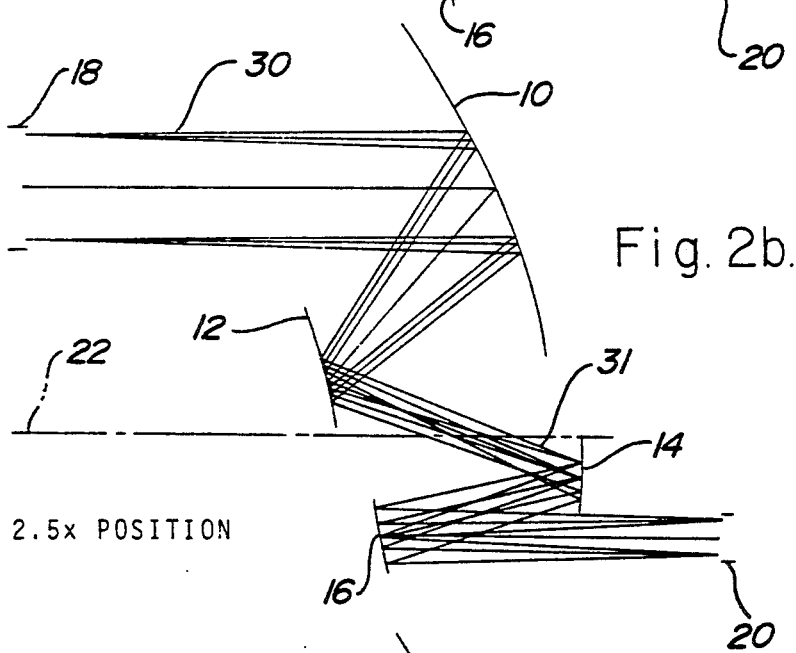
Figure 2C:
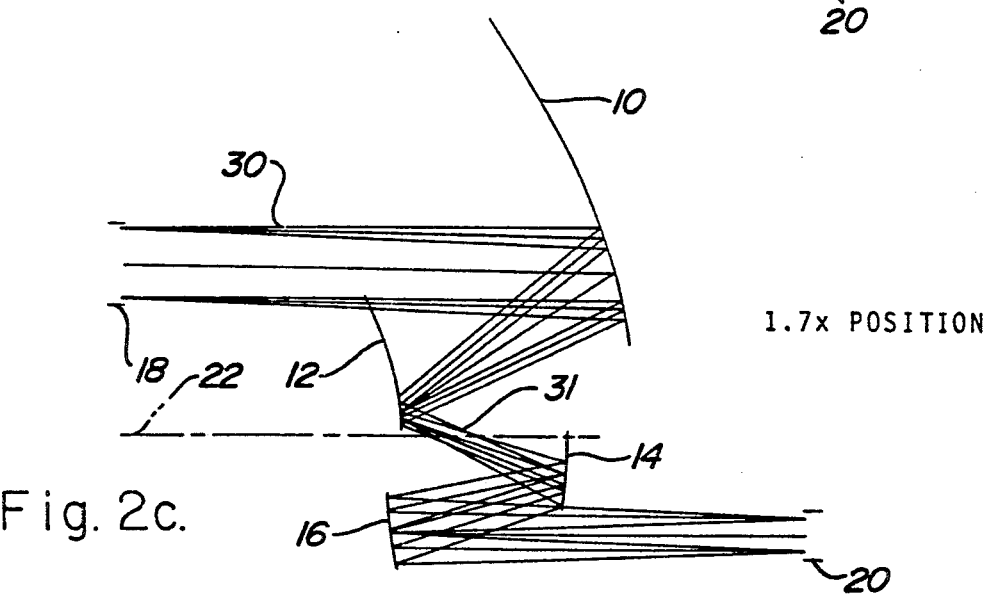

In FIG. 1, the movable secondary 12, tertiary 14 and quaternary 16 mirrors are illustrated (in phantom) in varying positions along the travel paths of the mirrors. FIGS. 2a–2c illustrate the system at the three different phantom positions of FIG. 1 along the mirrors travel paths. The three positions are the 3.6×, 2.5× and 1.7× magnification positions. The field of view in the object space varies from 0.95° at the 3.6× position to 2° at the 1.7× magnification position.

At the 3.6× magnification position, the on-axis 80% geometrical blur diameter in the object space is less than 0.09 milliradians. At the 1.7× magnification position, the on-axis 80% blur diameter in the object space is less than 0.36 milliradians. At the 2.5× magnification position, the on-axis 80% blur diameter is approximately 4.6 milliradians. Thus, the system provides a room range which is appropriate for multi-field of view applications such as for search and acquisition functions as well as for tracking and detail imaging functions.

A specific prescription for the system in accordance with the present invention as illustrated in FIG. 1 is as follows:

TABLE 1

OPTICAL PRESCRIPTION OF A SPECIFIC EMBODIMENT OF OPTICAL SYSTEM OF THE PRESENT INVENTION

| # | Description | Radius | Conic Constant | Thickness |
|---|---|---|---|---|
| 18 | Entrance Pupil | Infinite | | 19.0 |
| 10 | Primary Mirror | −20.000 | −1.0000 | −6.98998 |
| 12 | Secondary Mirror | −8.10139 | −2.8103 | 13.1110 |
| 14 | Tertiary Mirror | −32.1935 | 0 | −10.2518 |
| 16 | Quaternary Mirror | 23.5583 | 0 | 10.2182 |
| 20 | Exit Pupil | Infinite | | |

[(+) Thickness are to the right;
(+) Radii have centers to the right]

TILT AND DEC DATA:

| | TYPE | YD | XD |
|---|---|---|---|
| 18 Entrance Pupil | Dec | +12.0 | 0 |
| 20 Exit Pupil | Dec | −3.24927 | 0 |

Clear Apertures and Obstructions

| | TYPE | CAY | CAX | YDEC | XDEC | TILT |
|---|---|---|---|---|---|---|
| 10 Primary Mirror | Rect | 5.80 | 2.70 | 9.00 | 0 | |
| 12 Secondary Mirror | Rect | 2.20 | 1.00 | 2.70 | 0 | |
| 14 Tertiary Mirror | Rect | 1.35 | 0.90 | −1.10 | 0 | |
| 16 Quarternary Mirror | Rect | 1.25 | 1.05 | −3.25 | 0 | |

| Ref OBJ Y-HT | REF AP Y-HT | OBJ A-MAG | REF SURF | IMG SURF |
|---|---|---|---|---|
| −0.872687E + 18(0.5 DG) | 2.5 | 0 | 1 | 15 |
| ER | EPR | | LENGTH | |
| 10.559827 | −.6909927 | −3.6179832 | 6.1210153 | |

No Aperture stop
Evaluation Mode is Afocal

Alternate Embodiments

| Parameter | | Current Value |
|---|---|---|
| CFG 2: | | |
| SAY FANG | Semi Field Angle | .75 |
| SAY | 18 Entrance Pupil | 1.875 |

TABLE 1-continued

OPTICAL PRESCRIPTION OF A SPECIFIC EMBODIMENT OF OPTICAL SYSTEM OF THE PRESENT INVENTION

| | | |
|---|---|---|
| YD | 18 Entrance Pupil | 8.9327766 |
| TH | 10 Primary Mirror | −7.932274 |
| TH | 12 Secondary Mirror | 8.855943 |
| TH | 14 Tertiary Mirror | −7.7615949 |
| TH | 16 Quaternary Mirror | 12.925344 |
| CFG 3: | | |
| SAY FANG | Semi Field Angle | 1.0 |
| SAY | 18 Entrance Pupil | 1.250 |
| YD | 18 Entrance Pupil | 5.9577749 |
| TH | 10 Primary Mirror | −8.6313326 |
| TH | 12 Secondary Mirror | 6.038513 |
| TH | 14 Tertiary Mirror | −6.5720958 |
| TH | 16 Quaternary Mirror | 15.252334 |

Moving to FIGS. 3 and 4a–4c, another embodiment of the present invention is illustrated. In this embodiment, two movable mirrors are utilized to provide a 4 to 1 zoom range of operation.

Referring to FIGS. 3 and 4a–4c, an afocal optical system is shown including primary 60, secondary 62 and tertiary 64 mirrors. The system also includes an aperture entrance pupil 66 and a variable position exit pupil 68.

The primary mirror 60 is a positive power mirror and is movably positioned such that the vertex of the primary mirror would be along the optical axis of the system 70. The primary mirror 60 may be an ellipsoidal conic or higher order aspheric mirror.

The secondary mirror 62 is a negative power mirror and is movably positioned such that it is in a cassegrain configuration with the primary mirror 60. The secondary mirror 62 includes a central axis 70 defining the system optical axis. The vertex of the secondary mirror 62 would be positioned along the optical axis of the system. The secondary mirror 62 may be an ellipsoidal conic or higher order aspheric mirror.

The tertiary mirror 64 is a positive power mirror. The tertiary mirror 64 is fixably or stationarily positioned with respect to the optical axis. The tertiary mirror 64 may be a hyperboloidal conic or higher order aspheric mirror. All of the above mirrors may be point testable conics.

The combination of movement of the primary and secondary mirrors preserves the line of sight, and focus collimation during the zoom operation. The position of the exit pupil varies during the zoom operation. All mirrors are centered along a common optical axis 70 and the movable mirror's movement is along the optical axis. The aperture entrance pupil is decentered with respect to the optical axis. The field of view is centered on the optical axis. Also, the size of the field of view in image space varies at different magnifications.

In operation, an object to be viewed is reflected by the movable primary 60 mirror. The light beams 72 from the object being viewed are received and reflected from the primary mirror 60 to the movable secondary mirror 62. The light beams 72 are received by and reflected from the secondary mirror 62 to the tertiary mirror 64. The beams 72 form an intermediate image 74 of the object being viewed approximately at the secondary mirror 62. The intermediate image formed by the beams 72 is reflected from the tertiary mirror 64 and is ultimately reimaged at infinity after passing through the variable position exit pupil 68.

Figure 3:
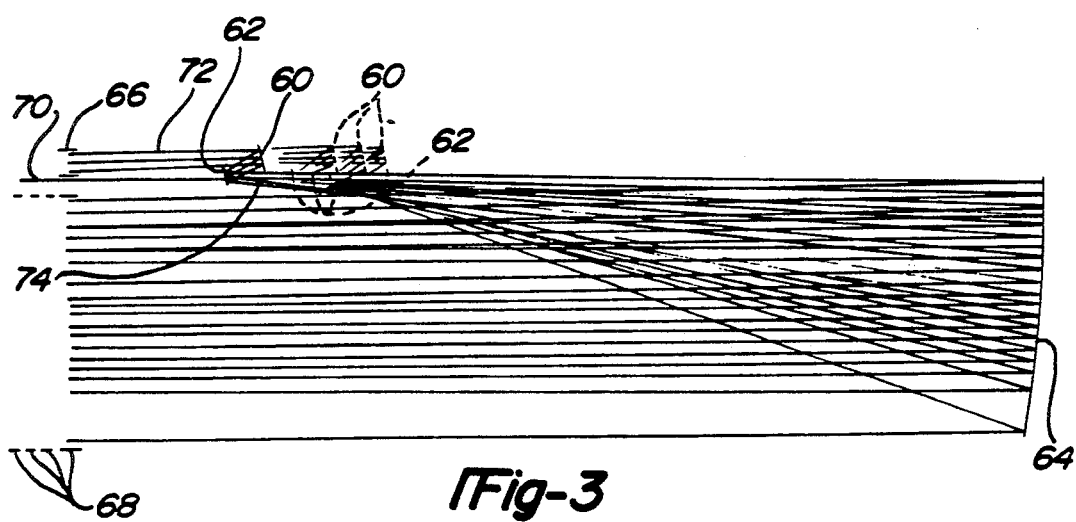
FIG. 3 is a schematic diagram of an along-scan view of another apparatus in accordance with the teaching of the present invention.
Figure 4A:
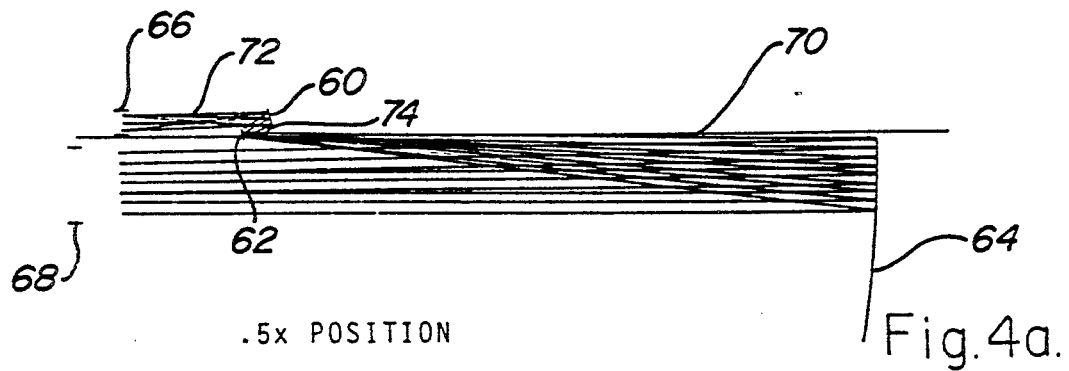
FIGS. 4a–4d are schematic diagrams of four zoom positions of the along-scan view of FIG. 3.
Figure 4B:
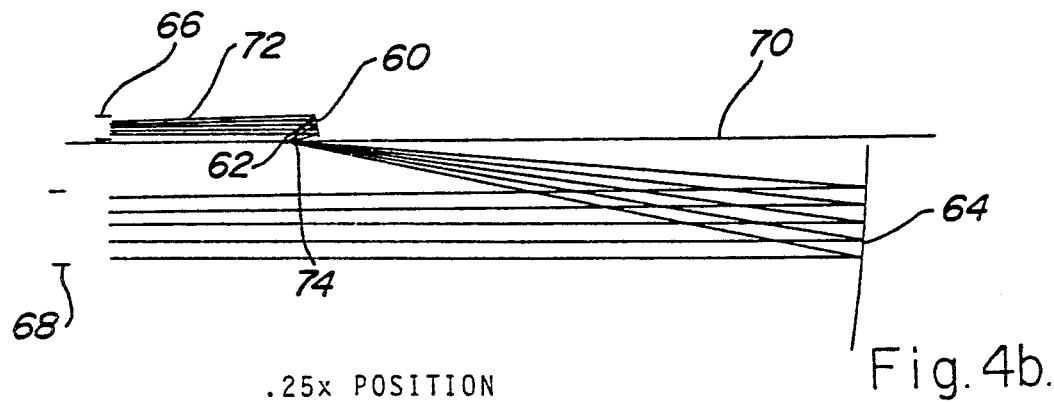
Figure 4C:
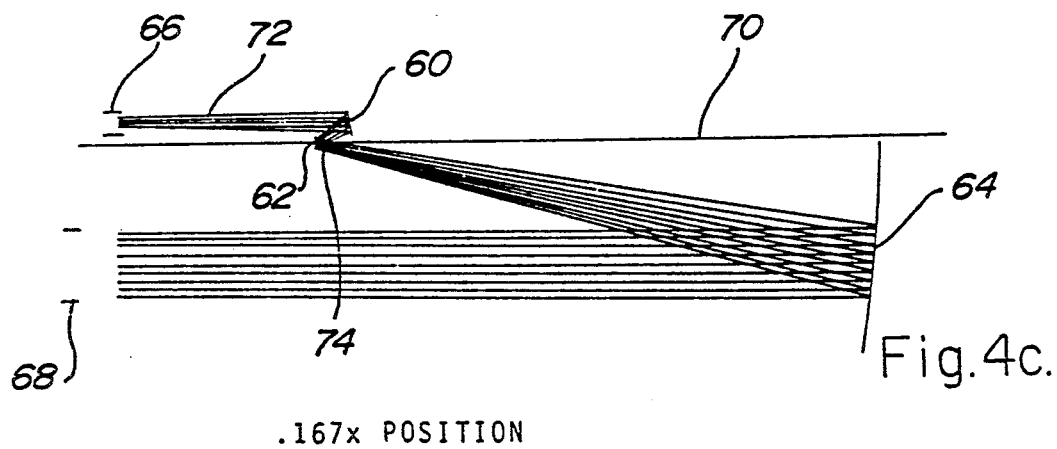
Figure 4D:
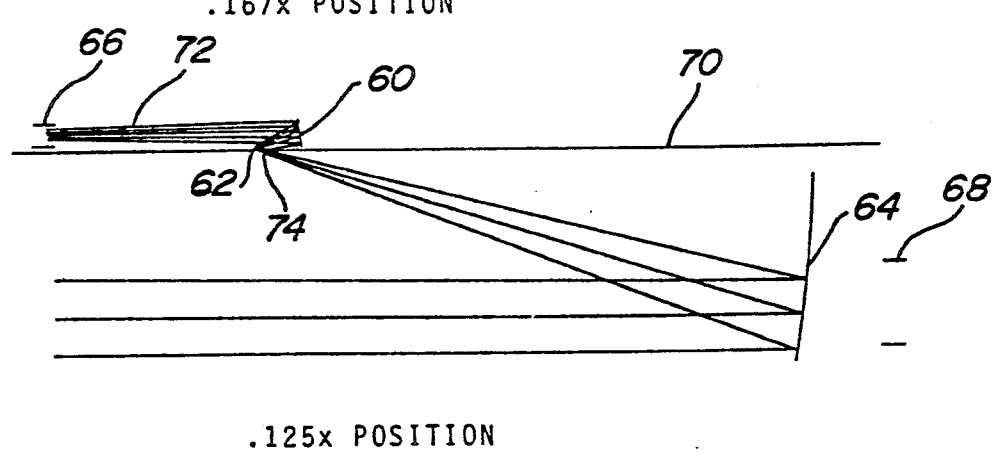

In FIG. 3, the movable primary 60 and secondary 62 mirrors are illustrated in phantom at varying positions along the travel path of the mirrors. FIGS. 4a-4c illustrate the system at four different or distinct positions along the mirrors' travel paths. The four zoom positions are the 0.5×, 0.25×, 0.167× and 0.125× magnification positions. The field of view in image space varies from 0.25° at the 0.125× to 1.0° at the 0.5× magnification position. The field of view in object space is 2°.

At the 0.5× magnification position, the on-axis geometrical blur diameter in the image space is less than 0.15 milliradians. At the 0.25× magnification position, the on-axis blur diameter in the image space is less than 0.06 milliradians. At the 0.167× magnification position, the on-axis blur diameter in the image space is less than 0.05 milliradians. And finally, at the 0.125× magnification position, the on-axis blur diameter in the image space is less than 0.084 milliradians. Thus, the system provides a zoom range from 0.125× to 0.5×. When this telescope is used in reverse, the zoom range of 2× to 8× is appropriate for multi-field of view applications such as for search and acquisition functions as well as for tracking and detailing functions. The system as described may be used as a zoom laser transmitter/receiver.

A specific prescription for the system in accordance with the present invention as illustrated in FIG. 3 is as follows:

TABLE 2

OPTICAL PRESCRIPTION OF A SPECIFIC EMBODIMENT OF OPTICAL SYSTEM OF THE PRESENT INVENTION

| # | Description | Radius | Conic Constant | Thickness |
|---|---|---|---|---|
| 66 | Entrance Pupil | Infinite | | |
| | Maximum Distance Between 66 and 60 | | | 8.68885 |
| 60 | Primary Mirror | −5.00000 | −0.76006 | −1.65745 |
| 62 | Secondary Mirror | −2.00000 | −0.88995 | 5.10442 |
| | Maximum Distance Between 62 and 64 | | | 30.8642 |
| 64 | Tertiary Mirror | −61.7284 | −1.0245 | −161.207 |
| 68 | Exit Pupil | Infinite | | |

[(+) Thickness are to the right;
(+) Radii have centers to the right]
TILT AND DEC DATA:

| | TYPE | YD | XD | ALPHA | BETA | GAMMA |
|---|---|---|---|---|---|---|
| 66 Entrance Pupil | Dec | +1.125000 | 0.000000 | | | |
| 68 Exit Pupil | Dec | −1.107600 | 0.000000 | | | |

Clear Apertures and Obstructions

| | TYPE | CAY | CAX | YDEC | XDEC | TILT |
|---|---|---|---|---|---|---|
| 60 Primary Mirror | Circ | 0.55000 | | 1.13 | 0.000E + 00 | |
| 62 Secondary Mirror | Circ | 0.30000 | | 0.320 | 0.000E + 00 | |
| 64 Tertiary Mirror | Rect | 5.6000 | 2.2500 | −5.70 | 0.000E + 00 | |

| REF OBJ Y-HT | REF AP Y-HT | OBJ SURF | REF SURF | IMG SURF |
|---|---|---|---|---|
| −0.872753E + 18(1.00 DG) | 0.25000 | 0 | 1 | 7 |

| ER | EPR | A-MAG | LENGTH |
|---|---|---|---|
| −119.26008 | −.48741464 | 0.49757604 | 34.311168 |

No Aperture Stop
Evaluation Mode is Afocal

Alternate Embodiments

| Parameter | | Current Value |
|---|---|---|
| CFG 2: | | |
| TH | Maximum Distance between 66 and 60 | 11.857000 |
| TH | 60 Primary Mirror | −1.8253996 |
| TH | 62 Secondary Mirror | 2.1042071 |
| YD | 68 Exit Pupil | −2.2136500 |
| TH | Maximum Distance Between 68 and 64 | −191.5385 |
| CFG 3: | | |
| TH | Maximum Distance between 66 and 60 | 13.065200 |
| TH | 60 Primary Mirror | −1.9859589 |
| TH | 62 Secondary Mirror | 1.0565768 |
| YD | 68 Exit Pupil | −3.3125500 |
| TH | Maximum Distance Between 68 and 64 | −124.8636 |
| CFG 4: | | |
| TH | Maximum Distance Between 66 and 60 | 13.777950 |
| TH | 60 Primary Mirror | −2.1498787 |
| TH | 62 Secondary Mirror | 0.50772223 |
| YD | 68 Exit Pupil | −4.4726850 |
| TH | Maximum Distance Between 68 and 64 | +56.7823 |

While the above describes preferred embodiments of the present invention, it will be understood that the prescriptions may be modified or changed without deviating from the scope of the invention.

The present invention has several advantages over conventional zoom type lenses. The present invention uses an all-reflective system to provide a zoom optical system. The present invention provides a multi-spectral instrument which may be utilized as an earth resources sensor with zoom capabilities. The present invention may also be utilized as a laser transmitter/receiver, target designator or FLIR in a ground based or space based application. Also, it is possible to use the present invention as a spectrometer telescope for spectral analysis of gases to determine their chemical composition.

It should be understood that while this invention has been described in connection with the particular examples hereof, that various modifications, alterations and variations of the disclosed preferred embodiments can be made after having the benefit of a study of the specification, drawings and the subjoined claims.

What is claimed is:

1. A reflective zoom optical system comprising:
   a mirror fixably positioned about a central axis; and
   means for reflecting an image of an object being viewed through an exit pupil for viewing, said reflective means including two or more mirrors positioned to receive light from or reflect light to said fixed mirror and said two or more mirrors movable through a plurality of positions to effect magnification or field of view of the system.

2. The reflective zoom optical system according to claim 1 wherein said two or more movable mirrors are each positioned such that vertices move along said central axis.

3. The reflective room optical system according to claim 2 wherein said two or more movable mirrors are positioned such that one of said movable mirrors receives light from said object being viewed and said other mirror receives light from said first movable mirror and reflects light to said fixed mirror.

4. The reflective zoom optical system according to claim 2 wherein said reflective means includes three movable mirrors positioned such that one of said movable mirrors receives light from said fixed mirror, the second of said movable mirrors receives light from said first movable mirror, and the third of said movable mirrors receives light from said second movable mirror.

5. The reflective zoom optical system according to claim 1 wherein said fixed mirror is a positive power mirror.

6. The reflective zoom optical system according to claim 2 wherein one of said movable mirrors is a negative power mirror.

7. A reflective zoom optical system comprising:
   a mirror fixably positioned about a central axis; and
   means for reflecting an image of an object being viewed through an exit pupil for viewing, said reflective means including two or more mirrors positioned to receive light from or reflect light to said fixed mirror and said two or more mirrors movable through a plurality of positions to effect magnification and field of view of the system.

8. The reflective zoom optical system according to claim 7 wherein said two or more movable mirrors are each positioned such that vertices move along said central axis.

9. The reflective zoom optical system according to claim 8 wherein said two or more movable mirrors are positioned such that one of said movable mirrors receives light from said object being viewed and said other mirror receives light from said first movable mirror and reflects light to said fixed mirror.

10. The reflective zoom optical system according to claim 8 wherein said reflective means includes three movable mirrors positioned such that one of said movable mirrors receives light from said fixed mirror, the second of said movable mirrors receives light from said first movable mirror and the third of said movable mirrors receives light from said second movable mirror.

11. The reflective zoom optical system according to claim 7 wherein said fixed mirror is a positive power mirror.

12. The reflective zoom optical system according to claim 8 wherein one of said movable mirrors is a negative power mirror.

13. A reflective zoom optical system comprising:
   a primary mirror fixably positioned about a central axis; and
   means for reflecting an image of an object being viewed through an exit pupil for viewing, said reflective means including two or more mirrors positioned to receive light from said fixed primary mirror and movable through a plurality of positions to effect magnification or field of view of the system.

14. The reflective zoom optical system according to claim 13 wherein said two or more movable mirrors are each positioned such that vertices move along said central axis.

15. The reflective zoom optical system according to claim 14 wherein said reflective means includes three movable mirrors positioned such that one of said movable mirrors receives light from said fixed mirror, the second of said movable mirrors receives light from said first movable mirror and the third of said movable mirrors receives light from said second movable mirror.

16. The reflective zoom optical system according to claim 13 wherein said fixed mirror is a positive power mirror.

17. A reflective zoom optical system comprising:
   a mirror fixably positioned about a central axis; and
   means for reflecting an image of an object being viewed through an exit pupil for viewing, said reflective means positioned to reflect light to said fixed mirror and movable through a plurality of positions to effect magnification or field of view of the system.

18. The reflective zoom optical system according to claim 17 wherein said reflective means comprises one or more movable mirrors each positioned such that vertices move along said central axis.

19. The reflective zoom optical system according to claim 18 wherein said reflective means includes a pair of movable mirrors positioned such that one of said movable mirrors receives light from said object being viewed and said other mirror receives light from said first movable mirror and reflects light to said fixed mirror.

20. The reflective zoom optical system according to claim 17 wherein said fixed mirror is a positive power mirror.

* * * * *